March 11, 1941.  E. G. CHAMBERS  2,234,232
WELDING APPARATUS
Filed Sept. 23, 1939
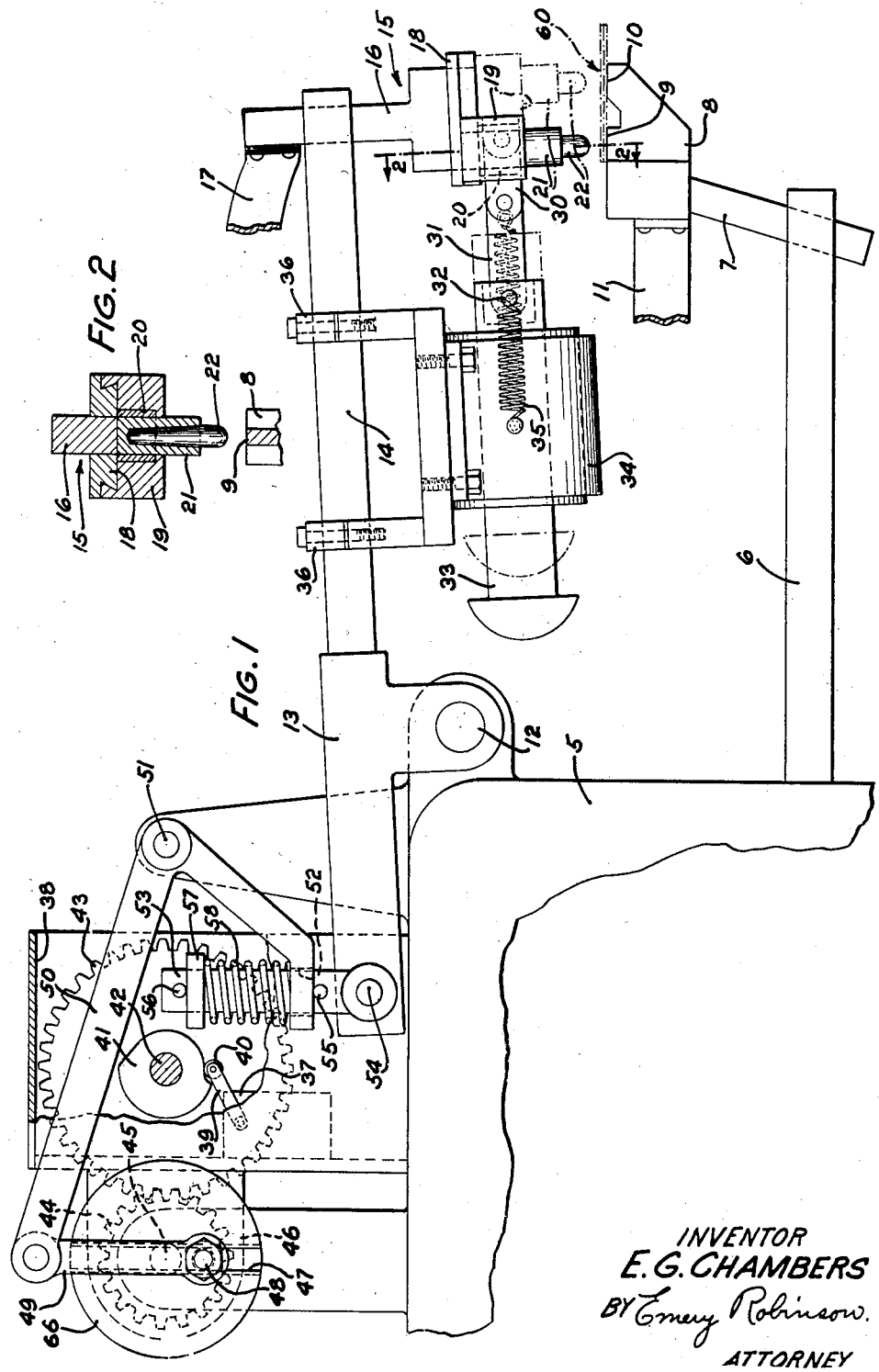
INVENTOR
E. G. CHAMBERS
BY Emery Robinson
ATTORNEY Patented Mar. 11, 1941

2,234,232

UNITED STATES PATENT OFFICE 2,234,232

WELDING APPARATUS

Edwin G. Chambers, Baltimore, Md., assignor to Western Electric Company, Incorporated, New York, N. Y., a corporation of New York Application September 23, 1939, Serial No. 296,247

7 Claims. (Cl. 219—4)

This invention relates to welding apparatus and more particularly to a spot welder having an indexing mechanism for the movable electrode.

It is an object of the present invention to provide a simple spot welding apparatus for automatically making a plurality of welded joints adjacent one to another.

In accordance with one embodiment of the invention, a spot welding apparatus is provided with two closely adjacent stationary electrodes having associated therewith a single electrode movable toward and away from the stationary electrodes. The movable electrode, in addition to its movement toward and away from the stationary electrodes, is automatically actuated to move from association with one stationary electrode into association with the other stationary electrode. A solenoid actuated mechanism operating in timed relation to the reciprocation of the movable electrode toward and away from the stationary electrodes is provided for indexing the movable electrode in a plane substantially parallel to the plane of the stationary electrodes so that the movable electrode is associated alternately with the two stationary electrodes.

A better understanding of the invention may be had by reference to the accompanying drawing, wherein—

Fig. 1 is a side elevational view of a spot welding apparatus embodying the features of the invention and Fig. 2 is a vertical sectional view taken along the line 2—2 of Fig. 1 in the direction of the arrows.

Referring to the drawing, wherein like reference characters designate the same parts throughout the several views, the welding apparatus is mounted upon a base 5 from which extends a horizontal bracket 6 carrying at its outer end a supporting bar 7, which carries at its upper end a stationary welding electrode assembly 8 having two welding surfaces or electrodes designated 9 and 10. The electrode assembly 8 is insulated from the supporting bar 7 and is electrically connected to a suitable source of welding current through a bus bar 11.

Pivoted on the base 5 at 12 is a ram carrying lever 13 on which a ram 14 is fixed. The outer or right hand end (Fig. 1) of the ram 14 supports a welding assembly 15, which comprises a T-shaped member 16, preferably made of copper, and connected to the welding current source by a flexible bus bar 17. Also included in the welding assembly 15 is a hardened steel way 18 which surrounds the bottom of the T-shaped member 16 and has slidably mounted on it a hardened steel follower 19 having mounted therein a steel bushing 20. The bushing 20 has mounted on it an electrode supporting member 21, which carries an electrode 22 adapted to cooperate with the stationary electrodes 9 and 10. The stationary electrodes 9 and 10 and the movable electrode 22 may be cooled in any suitable manner known to the art and the electrode 22 is carried by the member 21 in such position that the member 21 always engages the T-shaped member 16.

Extending outwardly to the left (Fig. 1) from the follower 19 is a projection 30 having pivotally connected thereto a link 31, the other end of which is pivoted at 32 to a movable element 33 of a solenoid 34. A contractile spring 35, fixed to the solenoid 34 and to the movable element 33 at 32, normally tends to hold the solenoid in the position shown in solid lines (Fig. 1). Energization of the solenoid will move its movable element 33 to the position shown in dot and dash lines and will move the follower 19 and the parts supported thereby to the dotted line position shown for them. The solenoid 34 is mounted by means of a suitable bracket 36 on the ram 14 intermediate its ends and is electrically interconnected by wiring, not shown, to a limit switch 37 mounted in a housing 38, which, in turn, is positioned upon the base 5. The limit switch 37 has an actuating arm 39 carrying a cam roller 40, which is spring urged into engagement with the surface of a cam 41. The cam 41 is carried by a shaft 42 rotatably mounted in the housing 38 and carrying a gear 43, which meshes with a gear 44 mounted upon a shaft 45.

The shaft 45 may be driven from any suitable source of power through a single revolution clutch, indicated generally at 46, and which may be of any suitable type, which, upon manual actuation, will connect the source of power, not shown, to drive the shaft 45 through a single revolution. Each revolution of the shaft 45 will rotate the shaft 42 through one-half of a revolution due to the fact that the gear ratio between the gears 43 and 44 is two to one. The shaft 45 carries upon it an eccentric supporting plate 66 provided with a way 47, in which is pivot pin 48 may be fixed at any desired point along the length of the way 47. The pivot pin 48 may be adjusted in the way 47 to vary the degree of eccentricity of the pivot pin 48 with respect to the shaft 45, thereby to control the amount of movement imparted to a link 49, which is pivotally connected to the pivot pin 48. Pivoted at the other end of the link 49 is a bell crank lever 50, which is pivotally mounted on the base 5 at 51 and which has one of its arms apertured, as shown at 52, to receive an actuator rod 53 slidably therein. The actuator rod 53 is pivoted at 54 to the lever 13 and has a pair of pins 55 and 56 extending through it. The pin 55 is positioned to abut the lower surface of the apertured arm of the bell crank lever 50, which is urged downwardly by a compression spring 58 interposed between a collar 57 and the apertured arm of the bell crank lever 50. The collar 57 is restrained from movement upwardly with respect to the actuator rod 53 by the pin 56.

In the operation of the hereinbefore described apparatus, the two parts to be welded, such as shown in dot and dash lines at 60, may be placed upon the stationary electrodes 9 and 10 and the single revolution clutch actuated to operate twice. The first revolution imparted to the shaft 45 by the single revolution clutch 46 will cause the link 49 and bell crank 50 through the spring 56, collar 57 and actuator rod 53 to rock the lever 13 in a clockwise direction and carry the electrode 22 into engagement with the parts to be welded and the parts will be gripped between the electrodes 9 and 22 with a pressure depending upon the strength of the spring 56. The completion of the first cycle of rotation of the shaft 45 will restore the apparatus to the position shown in full lines. As the ram 14 approaches the position shown after having once been moved downwardly the cam roller 40 will ride up the lobe of cam 41, thereby to actuate the limit switch 37 and supply power to the solenoid 34. The solenoid 34, upon energization, will move the electrode 22 and its associated parts to the position shown in dot and dash lines (Fig. 1) and upon the next rotation of the shaft 45, the electrode 22 will be moved into engagement with the parts 60 to be welded together adjacent the electrode 10. The completion of the second cycle of rotation of the shaft 45 will restore the apparatus to the position shown.

It is believed to be apparent that for every two revolutions of the shaft 45, shaft 42 will be rotated once and that the double cycle of shaft 45 will cause the electrode 22 to engage the parts 60 to be welded together first adjacent the electrode 9 and then adjacent the electrode 10 and the apparatus will return to the position shown.

Although a specific embodiment of the invention has been described hereinbefore it will be understood that modifications thereof may be made without departing from the scope of the invention which is to be limited only by the appended claims.

What is claimed is:

1. In a spot welding apparatus, a pair of stationary electrodes, a movable electrode movable in a substantially vertical plane to engage one of said stationary electrodes, and a solenoid actuated mechanism for shifting said movable electrode in a substantially horizontal plane to associate it with the second fixed electrode and means for energizing the solenoid once during each two movements of the movable electrode in a substantially vertical plane.

2. In a spot welding apparatus, a pair of stationary electrodes, a single movable electrode for association with said pair of stationary electrodes, means for moving said movable electrode into cooperating relation with said stationary electrodes, and means for alternately shifting said movable electrode from operative position above one stationary electrode to operating position above the other stationary electrode in timed relation to the movement of said movable electrode into association with the stationary electrodes.

3. In a spot welding apparatus, a driven shaft, a movable electrode, means associated with said shaft for imparting a predetermined amount of reciprocation to said movable electrode, and means operable under control of said shaft for shifting said electrode including a solenoid for moving the electrode to one welding position and a spring for returning said electrode to its original position to effect spaced welds.

4. In a spot welding apparatus, a pair of stationary electrodes, a movable electrode, a lever for supporting the movable electrodes, means for oscillating the lever to move the movable electrode toward the stationary electrodes, and means including a solenoid for moving the movable electrode longitudinally of the lever in timed relation to the movement of the lever.

5. In a spot welding apparatus, a pair of stationary electrodes, a movable electrode, a lever for supporting the movable electrode, means for oscillating the lever to move the movable electrode toward the stationary electrodes, and means including a solenoid actuated electrode supporting member for moving the movable electrode longitudinally of the lever from association with one stationary electrode to the other upon alternate operations of the lever.

6. In a spot welding apparatus, a pair of stationary electrodes, a movable electrode, a lever for supporting the movable electrode, means for oscillating the lever to move the movable electrode toward the stationary electrodes, and means including a solenoid actuated member for moving the movable electrode from association with one stationary electrode into association with the other stationary elecrode, said last mentioned means being operable under control of the means for oscillating the lever.

7. In an spot welding apparatus, a pair of stationary electrodes, a movable electrode, a lever for supporting the movable electrode, means for oscillating the lever to move the movable electrode toward the stationary electrodes, and means including a solenoid actuated member for moving the movable electrode from association with one stationary electrode into association with the other stationary electrode, said last mentioned means being operable to move the movable contact in one direction upon alternate operations of the lever.

EDWIN G. CHAMBERS.